United States Patent [19]

de Pencier

[11] Patent Number: 4,726,244

[45] Date of Patent: Feb. 23, 1988

[54] REVERSIBLE CONTINUOUSLY VARIABLE TRANSMISSION

[76] Inventor: Robert D. de Pencier, P.O. Box 177, Kingston, Ontario, Canada, K7L 4V8

[21] Appl. No.: 849,562

[22] Filed: Apr. 8, 1986

[51] Int. Cl.$^4$ .............................................. F16H 15/16
[52] U.S. Cl. ....................................... 74/200; 74/196; 74/213
[58] Field of Search ................. 74/200, 199, 213, 216, 74/196, 194, 190, 721, 796, 190.5, 198, 201, 208, 793

[56] References Cited

U.S. PATENT DOCUMENTS

| | | | |
|---|---|---|---|
| 2,076,057 | 4/1937 | Almen | 74/196 |
| 2,157,065 | 5/1939 | Madle | 74/190.5 |
| 2,478,227 | 8/1949 | Bannister . | |
| 2,959,973 | 11/1960 | Madson | 74/200 |
| 3,487,727 | 1/1970 | Gustafsson | 74/796 |
| 3,653,272 | 4/1972 | Scheiter | 74/190.5 |
| 3,727,474 | 4/1973 | Fullerton | 74/200 |
| 3,810,398 | 5/1974 | Kraus . | |
| 3,826,148 | 7/1974 | Magill . | |
| 4,159,653 | 7/1979 | Koivunen | 74/200 |
| 4,296,647 | 10/1981 | Kemper . | |
| 4,339,966 | 7/1982 | Kraus . | |
| 4,386,536 | 6/1983 | Kraus | 74/200 |
| 4,499,782 | 2/1985 | Perry | 74/200 |

FOREIGN PATENT DOCUMENTS

| | | |
|---|---|---|
| 311080 | 1/1956 | Switzerland . |
| 625005 | 2/1936 | Germany . |
| 1531007 | 7/1967 | France . |
| 2236589 | 2/1973 | Germany . |

OTHER PUBLICATIONS

Carson, Robert W., "New and Better Traction Drives are Here", Machine Design, Apr. 18, 1984, pp. 148-155.
Carson, Robert W., "100 Years in Rview: Industrial Traction Drivers", Power Transmission Design, Oct. 1977 Loewenthal, S. H.; Rohn, D. A.; and Anderson, N. E. SAE Technical Paper Series 831304, International Off-Highway Meeting & Exposition Milwaukee, Wisconsin, Sep. 12-15, 1983.
"CVT Control System: Some Design Considerations", Automotive Engineering, Oct. 1984, pp. 63-69.
Parker, Richard J.; Loewenthal, S. H.; and Fisch, G. K. "Design Studies of Continuously Variable Transmissions for Electric Vehicles", Society of Automotive Engineers, Inc. 1982 pp. 1570-1580.
"Metal-to-Metal Traction Drives now have a New Lease on Life", Product Engineering, Oct., 1971, pp. 33-37.
Stubbs, P.W.R. "The Development of a Perbury Traction Transmission for Motor Car Applications", Journal of Mechanical Design, Jan. 1981, vol. 103, pp. 29-40.
Raia, E. "Continuously Variable Transmissions", High Technology, Jul. 1984, pp. 65-72.
"Rubber-Band Cars are Coming Back", Mechanical Engineering, Dec. 1984, pp. 34-38.
Najlepszy, F. "Traction Drives Roll up Impressive Gains", Machine Design, Oct. 24, 1985, pp. 68-75.
McCormick, D. "Traction Drives Move to Higher Powers", Design Engineering, Dec. 1980, 35-39.
Kraus, J. H.; Kraus, C. E.; and Gres, M. E. "A Continuously Variable Transmission for Automotive Fuel Economy", Excelermatic, Inc., 751180.

Primary Examiner—Randolph A. Reese
Assistant Examiner—Peter M. Cuomo
Attorney, Agent, or Firm—Barrigar & Oyen

[57] ABSTRACT

The continuously variable transmission of the present invention comprises a pair of elements such as toroidal discs, spaced from each other and rotatable about a transmission axis and having facing surfaces, a third element rotatable about the transmission axis, having at least one roller rotatably mounted on a portion of the third element between the first and second elements for peripheral surface contact with the facing concave surfaces of the first and elements, and means for shifting the points of contact between the roller and the first element and the roller and the second element so as to change the radii from the transmission axis of the points of contact. Preferably, the discs are the driver elements, and the third element is the driven element. The angular velocity of the driven third element can be continuously varied form forward through neutral to reverse, which obviates the need for either a clutch for shifting the transmission into neutral or an external reverse gear for reversing the output of the transmission.

27 Claims, 12 Drawing Figures

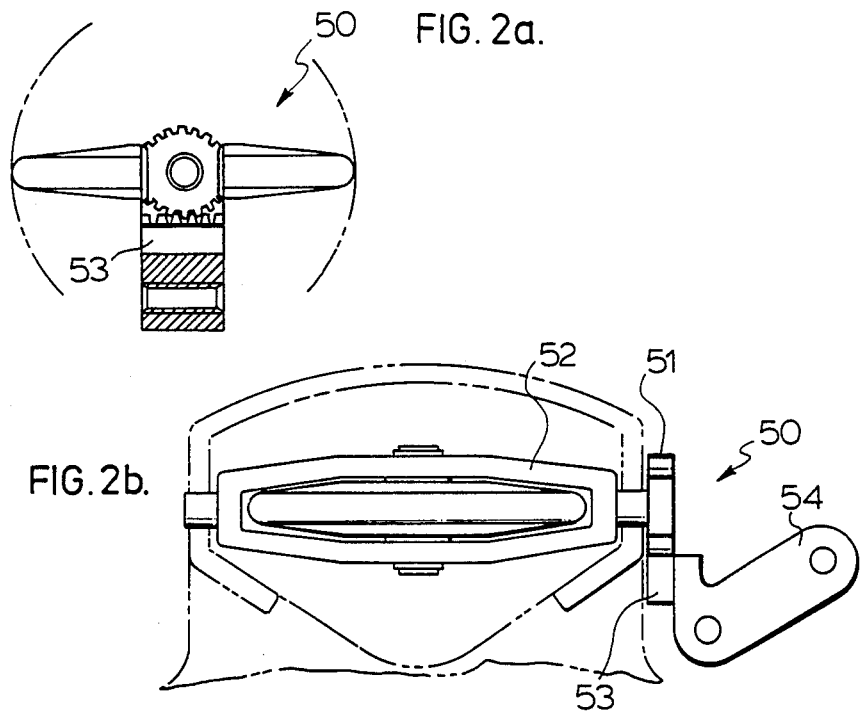
FIG. 2a.
FIG. 2b.
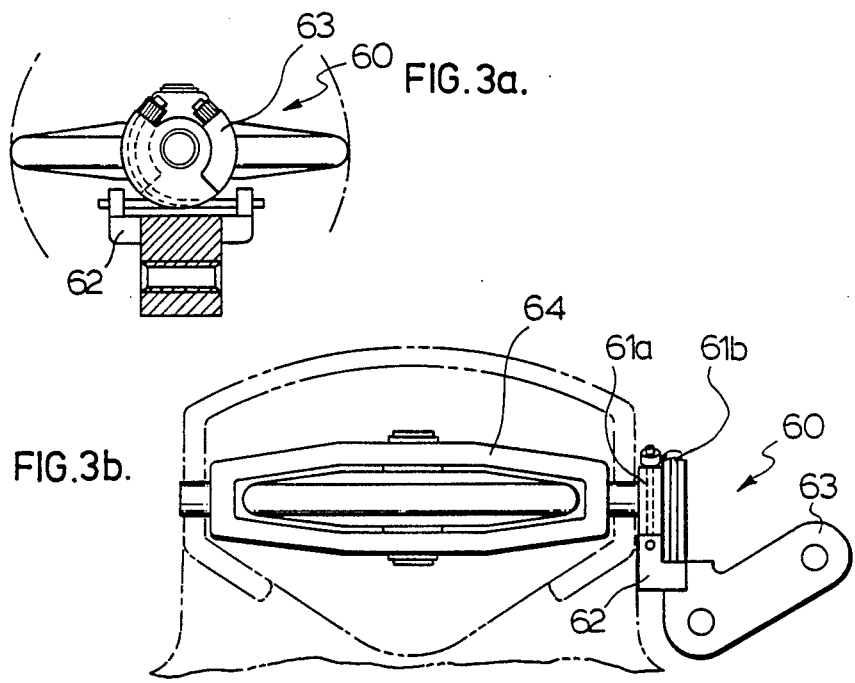
FIG. 3a.
FIG. 3b.

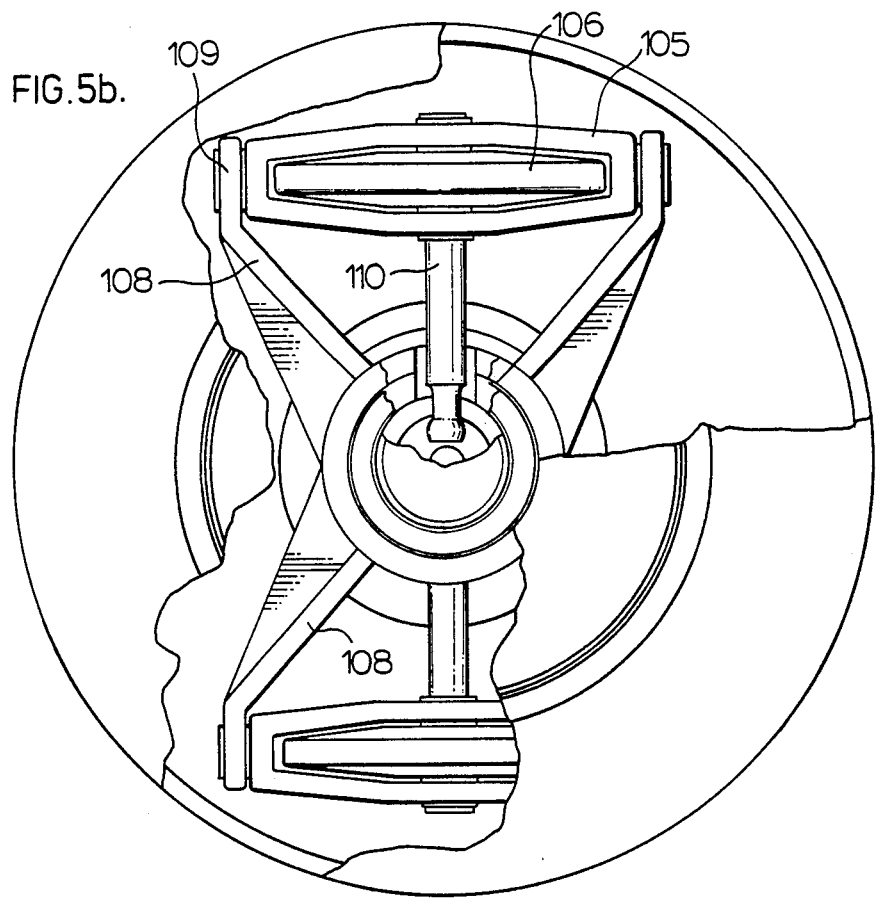
FIG.5b.
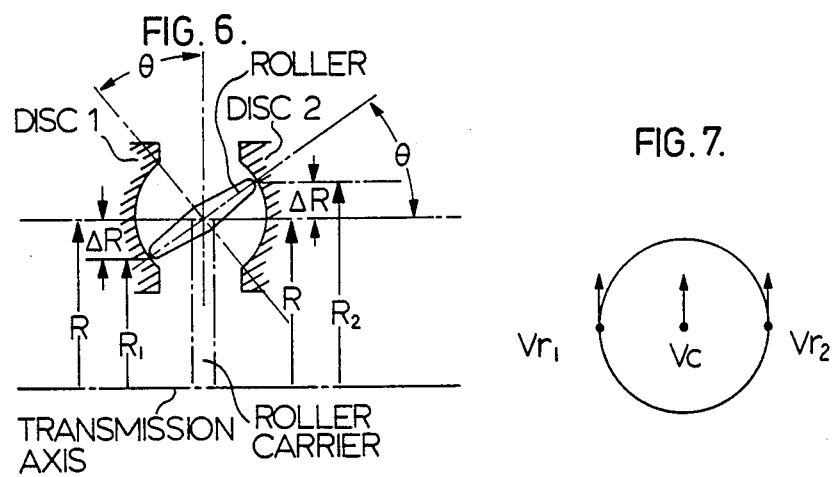
FIG. 6.
FIG. 7.

REVERSIBLE CONTINUOUSLY VARIABLE TRANSMISSION

FIELD OF THE INVENTION

This invention relates to continuously variable transmissions (CVTs), and more particularly, to continuously variable transmissions of the roller-traction type.

BACKGROUND OF THE INVENTION

The use in vehicles of the combination of an internal combustion engine and a conventional geared transmission is inherently inefficient. Because there is a single speed and load at which an internal combustion engine is most efficient, variations in load and the finite number of gear steps in conventional transmissions result in operation away from the highest efficiency region. Moreover, the need for sudden increases in power requires high powered engines, which are usually under utilized.

Continuously variable transmissions—which are capable of producing a continuously variable output for a constant input are more efficient than geared transmissions, because they enable an internal combustion engine to be operated at a constant, most efficient speed. Continuously variable transmissions of various types have been known for many years. For example, U.S. Pat. No. 197,472, granted to Hunt on 27 Nov., 1877, discloses a continuously variable transmission of the roller-friction type, comprising a first toroidal disc mounted on the end of a drive shaft, a second opposed toroidal disc mounted on an output shaft, and an adjustable roller mounted on a fixed base between the two discs. The roller contacts the opposing faces of the two discs, with the result that as the first disc is rotated in one direction by the drive shaft, the second disc is rotated in the opposite direction. The roller can be tilted so as to contact the two discs at different radii from the axis of rotation of the discs. Since the tangential velocity at a given point on a disc is equal to the angular velocity of the disc multiplied times the radius (the distance between such point and the disc axis of rotation), and since the tangential velocity of the roller at the point of contact with the driven disc is necessarily equal to the tangential velocity of the roller at the point of contact with the driven disc, tilting the roller to contact the discs at unequal radii causes the output disc and the output shaft to be rotated at various angular velocities both slower and faster than the drive shaft velocity. The Hunt transmission is a friction drive, and is restricted to relatively low power and/or intermittent use application, but over the years, developments in tractive fluids and thrust bearing technologies have increased interest in the use of this general type of continuously variable transmissions in vehicles such as the automobile.

However, these continuously variable transmissions have certain inherent limitations, including:

(1) It is not possible to obtain a zero output velocity, so recourse must be had to clutches or other means for disengaging the transmission from the input or the output shaft, for purposes of idling or stopping.

(2) The speed of the output shaft cannot be continuously varied from forward through zero to reverse, so externally shifting gearing must be provided to reverse the direction of the vehicle.

SUMMARY OF THE INVENTION

It has been found that the limitations of known continuously variable transmissions can be overcome by means of a continuously variable transmission comprising three main elements rotating about a transmission axis, such as two spaced discs having facing surfaces and a roller carrier having an interdisc portion carrying at least one roller for peripheral surface engagement with the facing surfaces of the discs. Also provided is shifting means for shifting the points of contact between the roller and the first element and the roller and the second element so as to change the radii from the transmission axis of the points of contact. In theory, each of the three rotating elements can function as either a driver or a driven element. When the motion of any two is specified, the angular velocity of the third is determined. The angular velocity relationship between the three rotatable elements is selected by the shifting means, which preferably tilts the axes of rotation of the rollers.

In the preferred embodiment of the invention, the discs are the driver elements, and the roller carrier is the driven element. Preferably, the two discs are rotatably mounted on a shaft, and the roller carrier is rigidly mounted on the shaft between the discs. Tilting the rollers results in varying the angular velocity of the roller carrier. Output power may be taken from either the shaft or from the roller carrier (e.g. by means of a pulley). The discs are preferably driven at equal but opposite angular velocities, by means of a reversal gear, but other arrangements are possible.

The transmission of the present invention in one embodiment comprises a first disc rotatable about a transmission axis, a second disc spaced from the first disc and counter-rotatable about the transmission axis relative to the first disc, roller carrier means rotatable about the transmission axis, at least one roller rotatable on an interdisc portion of the roller carrier means, and roller tilting means for tilting the axis of rotation of the roller. The first disc and second disc have facing concave surfaces. The roller makes peripheral surface contact with the facing concave surfaces of the discs.

BRIEF DESCRIPTION OF THE DRAWINGS

The invention will now be described, by way of example only, with the reference to the following drawings, in which like numerals refer to like parts:

FIGS. 2a and 2b are side and front elevational views of an alternative embodiment of the actuation means of the preferred embodiment.

FIGS. 3a and 3b are side and front elevational views of another alternative embodiment of the actuation means of the preferred embodiment.

FIGS. 5a and 5b are partially cut-away side and front elevational views of an alternative embodiment of the invention;

FIG. 6 is a diagram showing the geometry of the present invention.

FIG. 7 is a diagram showing a rotating disc moving in a plane.

DETAILED DESCRIPTION OF THE PREFERRED EMBODIMENT

Figure 1A:
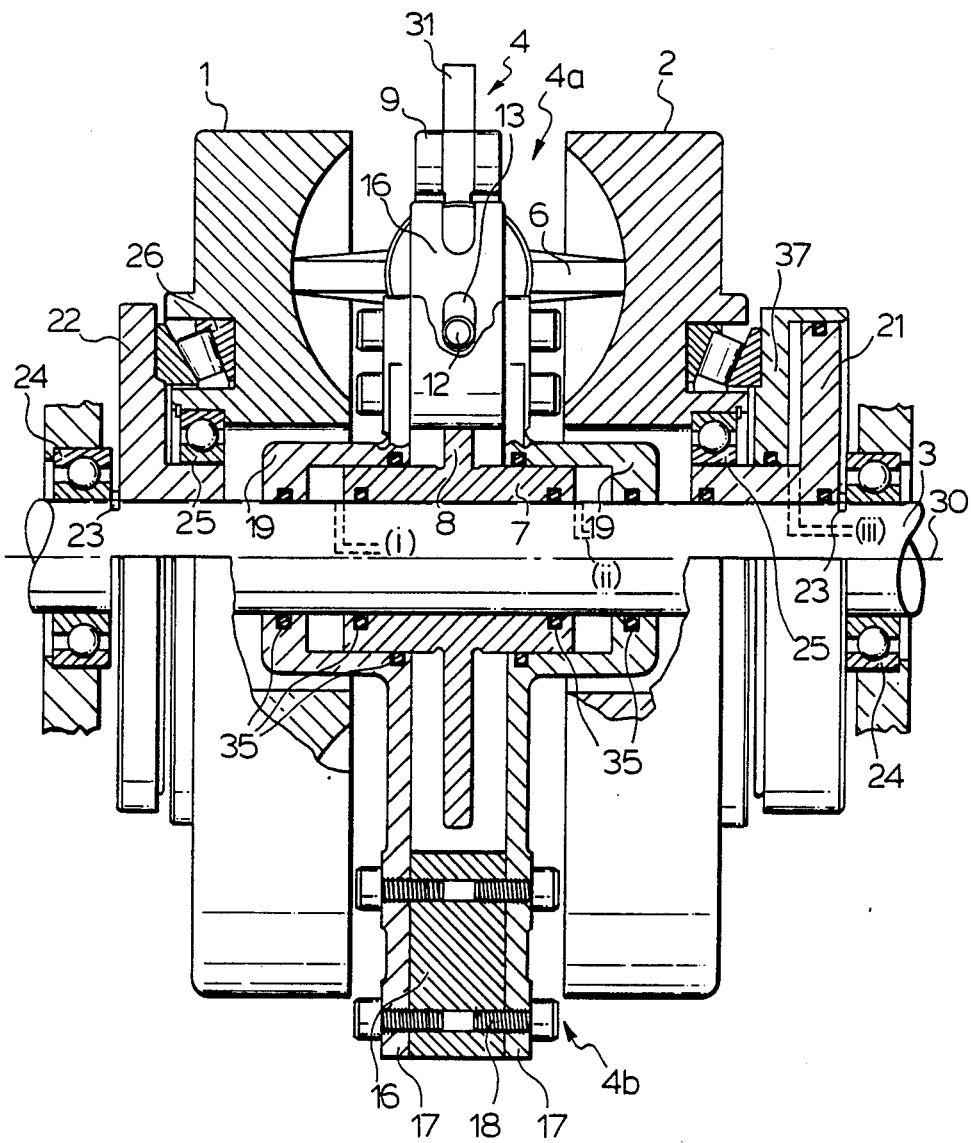
FIGS. 1a and 1b are partially cut-away side and front elevational views of the preferred embodiment of the invention.
Figure 1B:
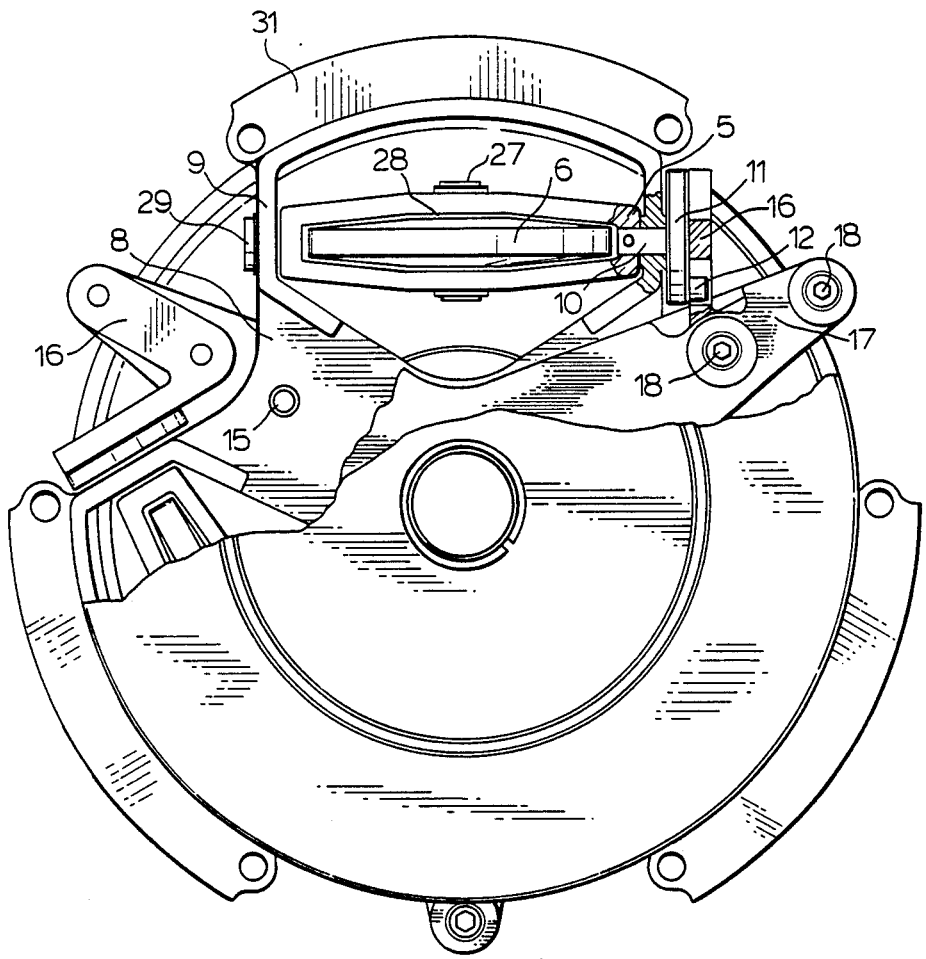

Referring now to FIGS. 1a and 1b, the preferred embodiment of the continuously variable transmission of the present invention comprises a pair of spaced, opposed discs 1, 2 rotatably mounted about the transmission axis 30 on shaft 3 by means of anti-friction bearings 25, and a roller carrier assembly shown generally as 4. Roller carrier assembly 4 comprises roller carrier means designated generally as 4a and a roller tilting means designated generally as 4b. Roller carrier means 4a comprises hub 7 fixed to shaft 3, and three roller support arms 8 integral with hub 7 and extending radially outwardly therefrom. Each of the three roller support arms 8 is provided at its free end with a yoke 9. Pivotally mounted within each of yokes 9 is roller cage 5. Within each roller cage 5 is rotatably mounted a roller 6, which is mounted therein by means of roller pin 27 and anti-friction bearing 28. Each roller cage 5 includes a cylindrical cage extension member 10 rotatably mounted in and extending through yoke 9. Rigidly mounted to the end of cage extension member 10 is cage drive end flange 11, which lies in a plane normal to the axis of rotation of cage 5. Roller cage 5 rotates in yoke 9 about cage pin 29 and cage extension member 10 in response to a rotation of cage drive end flange 11. Cage flange pin 12 extends outwardly from a bottom portion of cage drive end flange 11.

In the preferred embodiment, roller tilting means 4b comprises a pair of slider hubs 19 rotatably and axially slidably mounted on shaft 3, three pairs of radially extending slider arms 17 sandwiching therebetween roller support arms 8, each arm of each pair being integral with one of slider hubs 19, and three actuator blocks 16. Each actuator block is connected to a given pair of slider arms 17 by means of slider arm screws 18, which also couple together the pair of slider arms 17. Each slider arm 17 is configured to locate its actuator block 16 adjacent a cage drive end flange 11 associated with one of the rollers 6. Roller tilting means 4b is coupled to roller carrier means 4a by means of one or more slider pins 15, which are slidably received within apertures in support arms 8 so as permit axial movement of slider arms 17 (i.e. movement along the transmission shaft axis) relative to fixed support arms 8.

Each of actuator blocks 16 is provided with a slot 13 dimensioned to accept cage flange pin 12. Roller tilting means 4b also includes hydraulic sliding means for sliding the slider hubs along the transmission axis, including orifices (i) and (ii) in shaft 3. Slider hubs 19 are slid along shaft 3 by hydraulic fluid forced into the cavities defined by seals 35 through orifice (i) or orifice (ii) of shaft 3. It will be apparent that as hydraulic fluid is forced into one or the other cavity, slider hubs 19 will be driven to the left or right relative to the plane of support arms 8, with the result that actuator blocks 16 will interact with cage flange pins 12 so as to rotate the cage drive end flanges 11 of the three roller cages 5 counterclockwise or clockwise, by an identical amount. This rotation action will result in the axis of rotation of each of the three rollers 6 (defined by pins 27) being tilted in the same sense toward either first disc 1 or second disc 2.

Shaft 3 is mounted in housing 36 along transmission axis 30 by means of anti-friction bearings 24. Means for biassing the two discs together and for providing contact and traction forces at the roller-disc interfaces comprises thrust bearing 26, thrust ring 22, bias piston 21, retaining ring 23, and bias cylinder 37. Hydraulic fluid admitted through shaft orifice (iii) into the cavity defined by the seal between bias cylinder 37 and bias piston 21 provides the force required to maintain contact at the roller/disc interfaces. This force can be varied if desired to match the output torque; e.g. the contact force could be selected to be relatively high at low roller carrier speeds and relatively low at high roller carrier speeds.

Discs 1, 2 are preferably of equal masses and moments of inertia, in order to eliminate gyroscopic effects. Discs 1, 2 are preferably toroidal in shape, having identical facing concave surfaces, wherein the radius of curvature of the concave surfaces equals the radius of the rollers 6.

In the preferred embodiment, discs 1, 2 are driver elements which are capable of being rotated by a prime mover (such as an internal combustion engine or electric motor), and roller carrier assembly 4 is the driven element.

Roller tilting means 4b functions as a shifting means for shifting the points of contact between the rollers at each of the discs 1, 2 in a continuous or step-less fashion. Shifting each point of contact results in changing the radius from the transmission axis of such point of contact. As long as the radii of the points of contact between discs 1, 2 remain equal, the roller carrier means 4b will remain stationary, when the discs 1, 2 are counter-rotated at equal speeds. However, if for example the radius of the points of contact with disc 1 is decreased, while the radius of the points of contact with disc 2 are increased (this is achieved by tilting the rollers towards disc 1), then the roller carrier means as a whole will begin to rotate, assuming no slip between the rollers 6 and the discs 1,2, in order to satisfy the general relationship $$v = r \cdot \omega$$

where $v$ = the velocity of a point on a rotating disc at radius $r$, and $\omega$ = the angular velocity of the disc.

Applying the above relationship to both discs, in the case in which the discs are counter-rotating at the same speed, requires the velocity of a point on the roller in contact with disc 1 to be less than the velocity of a point on the same roller in contact with disc 2. This cannot be achieved by a roller mounted in a stationary fashion, in the absence of slip, for all points on the periphery of the roller must necessarily rotate at the same speed. Accordingly, the roller carrier means on which is mounted the roller must rotate about the transmission axis in the direction in which disc 1 is rotating, so that the resultant velocity of a point on the roller will equal $\omega \cdot r_1$ when it is in contact with disc 1 at radius $r_1$, and $-\omega \cdot r_2$ where it is in contact with disc 2 at radius $r_2$, where $r_2 < r_1$.

Moreover, it can be shown that $\omega_c$, the angular velocity of the roller carrier means, can be expressed as follows, for the case in which the discs are counter-rotated at equal speeds:

$$\omega_c = (-r/R)\omega_d \sin \theta$$

where $r$ = radius of the roller, $R$ = distance from the transmission axis to the center of the roller, $\omega_d$ = the angular velocity of a disc, and $\theta$ = the tilt angle; the derivation of this formula is shown in the Appendix hereto. $\omega_c$ changes sign as $\theta$ is changed from a small positive value to a small negative value. Accordingly, the present invention provides continuously variable transmission which can be driven in either direction through zero velocity, and for which continuous or stepless variation of speed settings is possible, while the roller carrier is either moving or stationary, without the need for output shaft gearing or clutch means. Output power can be taken from either end of shaft 3, or from roller carrier assembly 4 via a pulley or the like attached to arm extenders 31. Of course, if the discs are rotated in the same direction, the roller carrier assembly cannot be made to reverse without external gearing; thus it is preferable to counter-rotate the discs.

In order to drive the transmission, pulleys could be attached to the shoulder 34 of the discs 1, 2. Alternatively, the discs could be coupled together by a reversal and ring gear system, such that driving one of the discs would result in rotating the other of the discs with an equal but opposite angular velocity. Of course, there are other ways of driving the transmission, some of which are described below.

While the preferred embodiment comprises three rollers mounted in the roller carrier assembly in a balanced, circularly symmetric fashion, it will be appreciated that more or less rollers could be used. A one roller embodiment is possible, provided that roller carrier assembly is properly balanced. Four or more rollers can also be used, but the use of three is preferred, because they are self-aligning (three points define a plane), which reduces manufacturing tolerances.

Since output power can be taken directly from roller carrier assembly 4, it will be appreciated that shaft 3 is not essential, and can be replaced, for example, by a series of coaxial antifriction bearings mounted in a suitable housing along the transmission axis 30.

FIGS. 2a-2b and 3a-3b illustrate alternative embodiments of the actuation means of the preferred embodiment. Rack and pinion actuation means shown generaly as 50 in FIGS. 2a and 2b comprise pinion gear 51 coupled to roller cage 52, and rack 53 coupled to slider arm 54. In operation, as slider arm 54 is moved along the transmission axis, rack 53 rotates pinion 51, which in turn rotates roller cage 52.

Cable actuation means shown generally as 60 in FIGS. 3a and 3b comprises opposed flexible cables 61a and 61b coupling slider arm bocks 62 to roller cage flange 63. Cable actuation means operates in a similar fashion to rack and pinion actuation means 50, so as to rotate roller cage 64 without slack.

Figure 4A:
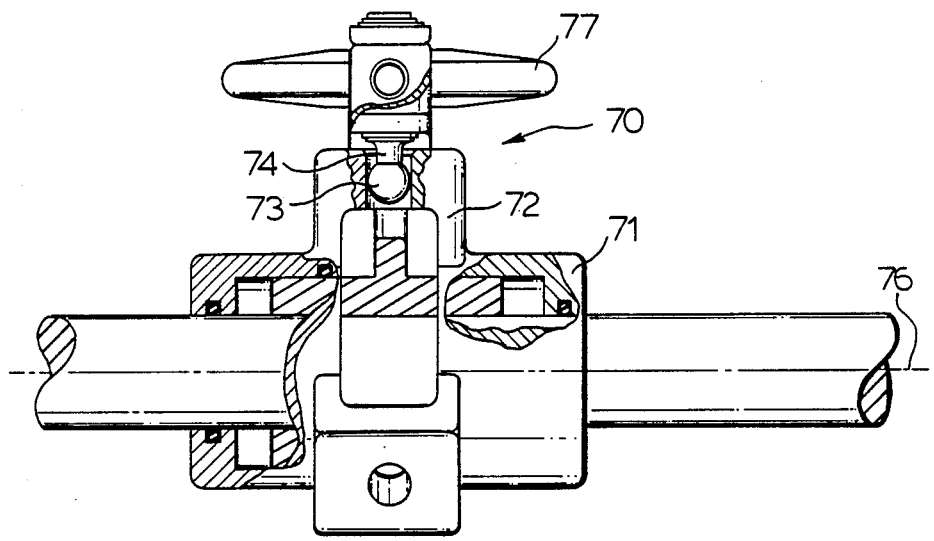
FIGS. 4a and 4b are side and front-elevational views of an alternative embodiment of the roller tilting means of the preferred embodiment.
Figure 4B:
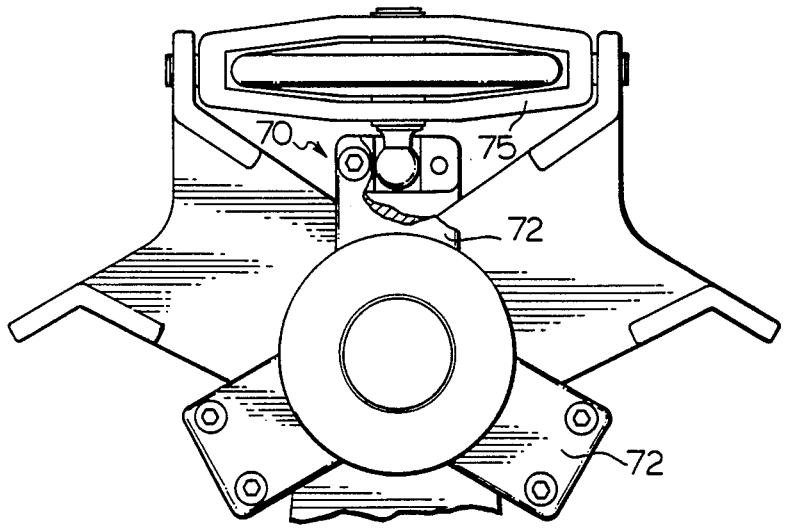

FIGS. 4a and 4b depict an alternative embodiment of the roller tilting means of the present invention. Roller tilting means designated generally as 70 comprises a hydraulic actuated slider hub 71 having three relatively short radially extending slider arms 72. Each slider arm 72 is provided at its free end with a recess for engaging the spherical end 73 of roller pin 74 extending from roller cage 75 along the roller axis. In operation, as slider hub 71 is moved along the transmission axis 76, slider arm 72 tilts roller pin 74, thus tilting roller 77.

Figure 5A:
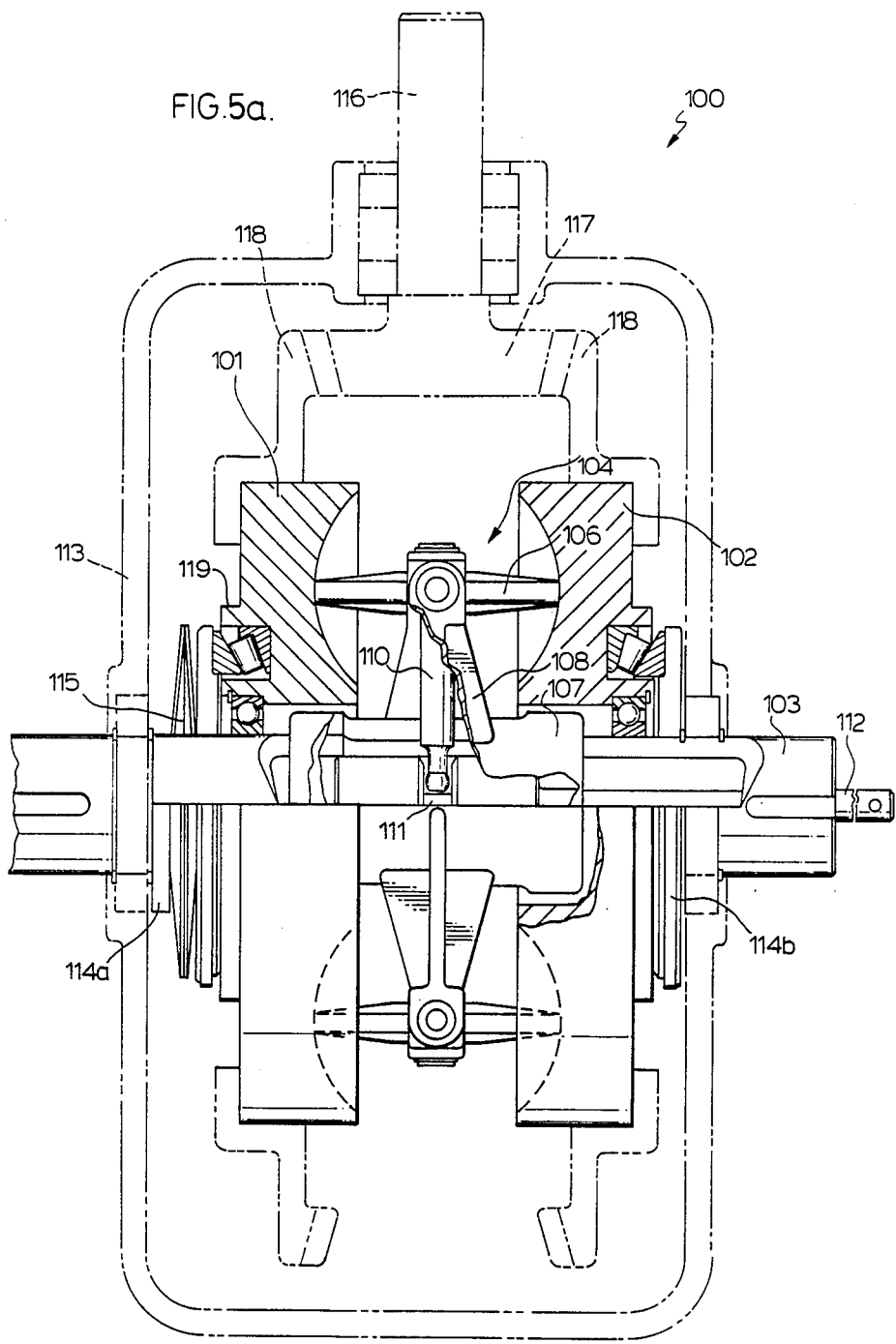

FIGS. 5a and 5b illustrate an alternative embodiment 100 of the present invention. Discs 101 and 102 are rotatably mounted on shaft 103. Roller carrier assembly shown generally as 104 comprises roller carrier hub 107 rigidly affixed to shaft 103, two roller arms 108 integral with and extending radially from roller hub 107, yokes 105 extending from the free ends of arms 108, and rollers 106 rotatably mounted in roller cages 105 rotatably mounted in yokes 109. Roller carrier assembly 104 also comprises roller tilting levers 110 for tilting the axes of rotation of rollers 106. The free ends of levers 110 are held within recess 111 of roller tilting rod 112 which is slidably received within shaft 103. Stops 114a and 114b and bias spring 115 bias discs 101 and 102 towards one another so that the facing surfaces thereof are kept in contact with the edges of rollers 108.

Shown in dotted lines in FIG. 5a are transmission housing 113, prime mover shaft 116 rotatably mounted within housing 113, reversal gear 117 mounted onto the end of shaft 116, and disc gears 118 engaging reversal gear 117. In operation, reversal gear 117, driven by shaft 116, counter-rotates discs 101, 102 at equal but opposite angular velocities. As velocity roller tilting rod 112 is moved within shaft 103 along the axis thereof, roller tilting levers 110 are tilted, causing rollers 106 to tilt in the same sense towards one or the other of discs 101, 102. This causes rollers 106 to contact discs 101, 102 at different radii, resulting in a torque on roller carrier assembly 104 about shaft 103, which causes roller carrier assembly 104 to rotate. The direction of rotation of carrier assembly 104 can be reversed by axially moving velocity rod 112 so as to tilt rollers 106 towards the other of the two discs 101, 102.

It will be appreciated that there are other ways of counter-rotating discs 101, 102. For example, the unit could be driven through a pulley (or gear) attached to disc 101 at shoulder 119, and gear 117 could be rotatably mounted in the housing but not driven, so as to counterrotate disc 102 through gear 118. It will also be apparent that discs 101, 102 could be rotated at different speeds if desired, by means of appropriate gearing.

It will be appreciated that the roller tilting means 4b of the preferred embodiment can be moved axially by mechanical rather than by hydraulic means. For example, axial rods located just outside the perimeter of discs 1, 2 could be used to bear against slider screws 18 or other portions of the slider assembly, so as to move slider assembly 20 back and forth along the transmission axis.

Preferably, the transmission of the present invention is housed so as to enable the use of tractive fluids at the roller/disc interfaces to reduce wear and increase capacity, although the transmission can be operated as a friction-drive without the use of such fluids.

By operating the transmission of the present invention in the preferred manner—that is, by counter-rotating the discs and taking the power out from either the shaft or the roller carrier assembly—it is possible to make the masses of discs 1, 2 relatively large, in order to take advantage of the flywheel effect. This is advantageous, because it is not necessary to reverse the direction of rotation of either of massive discs 1, 2, in order to reverse the direction of rotation of roller carrier assembly. It will be apparent, however, that the transmission of the present invention could also be run "backwards", that is, by driving shaft 3 or roller carrier assembly 4, and taking the power from either disc 1 or disc 2, by means of pulleys, for example.

The transmission of the present invention lends itself to the use of one or more flywheel-like elements for load-levelling and regenerative braking purposes particularly with respect to vehicles. It is only necessary that one of the discs of the transmission be made massive so as to serve as a flywheel, or to be driven by or connected to flywheel-like rotating elements. Such flywheel elements may simply be maintained at relatively constant speed by the prime mover (which may be operated intermittently), while power output from the transmission is provided either at torques demanded by the load at the carrier, resulting from the speed settings of the transmission from maximum forward continuously through maximum reverse, or torques otherwise limited by the device or its control system. In addition, when operated in this way, at least a portion of the energy otherwise lost to braking will be directly recovered as increased energy stored in the flywheel-like element, as the road/wheel forces needed to decelerate the vehicle will produce "backward" torques on the carrier and thus will effectively "drive" the discs to higher speed levels thus capturing some of the energy that would otherwise be lost if speed reduction was solely produced by braking. Although such uses of flywheels are known to those familiar with CVT applications, they have not heretofore been realizable without recourse to external clutches, reversing gears, and associated control system complexity.

An inherent problem in such uses of flywheels in drivetrains of such vehicles or other movable devices, is the gyroscopic effect and its influence on maneuvrability. An additional inherent feature of the transmission of this invention lends itself to the elimination of this problem. This is done by making the gyroscopic effects of the rotary inertias associated with the counter-rotating discs cancel when in motion. In the simplest case, the two discs will be made flywheel-like, of equal rotary moments of inertia and rotate in opposite directions at equal angular velocities.

As noted above, when the discs are interconnected to counter-rotate, if the flywheel-like elements are included, then reducing the speed setting of the transmission, on a moving vehicle, should cause the kinetic energy of the vehicle effectively to drive the transmission "backwards" as in the case outlined here. This "regenerative braking" would be an important feature for automotive applications.

Because it is undesirable to add to the overall weight of a vehicle such as a car or truck driven by an internal combustion engine, it is possible to take advantage of the flywheel effect as discussed above without greatly increasing the weight of the vehicle, by rotating the engine block rather than the drive shaft of the engine, as is conventionally done. This could be accomplished, for example, by fixing the drive shaft of the engine to the vehicle's frame, rather than fixing the engine block to the frame as is conventionally done. This would result in the engine block rotating about a fixed shaft. The rotating engine block could then be used as the prime mover to rotate one of discs 1, 2 by means of a belt and pulley system, so as to achieve a significant flywheel effect without adding unnecessary weight to the vehicle. Alternatively, discs 1, 2 could be designed so as to constitute the engine block of the motor of the vehicle.

For electrically powered vehicle applications, one or both of discs 1, 2 could make up part of the electric motor or motors which counter-rotate discs 1, 2. As before, additional mass could be added to the discs to provide the desired flywheel effect. Two counter-rotating motors, each made up of a pair of discs, could be utilized in order to cancel the moment of inertia.

In the further alternative, a pair of disc pairs could be placed back to back, in order to avoid the need for a thrust bearing.

FIG. 6 illustrates the case in which a roller is tilted towards disc 1 at an angle $\theta$ so as to contact disc 1 at a radius $R_1 = (R - \Delta R)$, R being the distance from the transmission axis to the roller center. Similarly, the disc contacts disc 2 at a radius $R_2 = (R + \Delta R)$.

Now, it is well known that, for a point moving in a circular path of radius r about an axis, the angular velocity $\omega$ and the tangential velocity v are related by:

$$v = r \cdot \omega$$

It follows that the tangential velocity of the points on discs 1 & 2 in contact with the roller are given respectively by:

$$v_1 = R_1 \cdot \omega_1 = (R - \Delta R) \cdot \omega_1$$

$$v_2 = R_2 \cdot \omega_2 = (R + \Delta R) \cdot \omega_2$$

where
$\omega_1$ = the angular velocity of disc 1, and
$\omega_2$ = the angular velocity of disc 2.

For the configuration shown in FIG. 6, the angular velocity of the carrier $\omega_c$ may be expressed in terms of the angular velocities of discs 1 & 2 as follows:

$$\omega_c = (v_c / R)$$

where
$v_c$ = the tangential velocity of a point on the roller carrier located at distance R from the transmission axis.

FIG. 7 shows a roller rotating at $\omega_r$ about its centre which is moving with velocity $v_c$ in the plane of the roller and in the direction of the arrow representing $v_c$. The velocities of the two points on the periphery of the roller which lie on the diameter perpendicular to the direction of $v_c$ will be parallel to $v_c$ and are indicated by the arrows representing $v_{r1}$ and $v_{r2}$ in the figure. The magnitudes of the velocities of these three points on the roller are related as follows:

$$v_{r1} = v_c + r \cdot \omega_r$$

$$v_{r2} = v_c - r \cdot \omega_r$$

where $r \cdot \omega_r$ = the tangential velocity at a point on the roller periphery resulting from the rotation of the roller at angular velocity $\omega_r$ and r = the radius of the roller. It follows, by adding these two equations, that $$v_{r1} + v_{r2} = 2v_c$$

$$v_c = \frac{v_{r1} + v_{r2}}{2}$$

Substituting for v, $$\omega_c = \frac{1}{R} \left( \frac{V_{r1} + V_{r2}}{2} \right)$$

where:
$v_{r1}$ = velocity of point on roller in contact with disc 1.
$v_{r2}$ = velocity of point on roller in contact with disc 2.
In the case of no slip, the velocities of the points on roller and disc in contact at interface point are equal, so it follows that:

$$\omega_c = \frac{1}{2R}(v_1 + v_2)$$

Or, from above:

$$\omega_c = \frac{1}{2R}[(R - \Delta R)\omega_1 + (R + \Delta R)\omega_2]$$

$$= \left(\frac{\omega_1 + \omega_2}{2}\right) - \frac{\Delta R}{R}\left(\frac{\omega_1 - \omega_2}{2}\right) \text{ or,}$$

$$\omega_c = \left(\frac{\omega_1 + \omega_2}{2}\right) - \frac{r}{R}\sin\theta \cdot$$

$$\left(\frac{\omega_1 - \omega_2}{2}\right) - \text{for } \Delta R = r\sin\theta$$

Finally, in the preferred mode of operation in which the discs are counter-rotated at equal angular velocities, $$\omega_1 = -\omega_2 = \omega_d$$

Thus, the angular velocity of the roller carrier $\omega_c$ may be expressed in terms of the angular velocities of the two discs, $\omega_1$ and $\omega_2$, as follows:

$$\omega_c = (-r/R)(\omega_d)\sin\theta$$

which is applicable for achievable positive and negative values of the angle $\theta \cdot \omega_c$ reverses sign as the angle $\theta$ is made to pass through zero.

It will accordingly be apparent to those skilled in the art that there are numerous variations and applications of the continuously variable transmission of the present invention. Those skilled in the art will further appreciate that the above description of the preferred and alternative embodiments is illustrative and not limiting, and that the scope of the invention is defined in the appended claims.

I claim:

1. A continuously variable transmission comprising a first element rotatable about a transmission axis, a second element spaced from the first element and rotatable about the transmission axis, wherein the first element and the second element have facing surfaces, a third power transmitting element fully rotatable about the transmission axis, and at least one roller rotatably mounted on a portion of the third element located between the first element and the second element for peripheral surface contact with each of the facing surfaces of the first and second elements, said roller interacting with said first and second elements and thereby rotating said third element about the transmission axis, and shifting means for shifting points of contact between the roller and the first element and the roller and the second element so as to change the radii extending from the transmission axis to the points of contact.

2. A transmission as defined in claim 1, wherein the shifting means comprises roller tilting means for tilting the roller axis of each of the at least one rollers.

3. A transmission as defined in claim 2, wherein the first and second elements are driver elements capable of being rotated by a prime mover, and the third element is a driven element capable of being driven by the interaction of the at least one roller with the surfaces of the driver elements so that power can be taken from the third element.

4. A transmission as defined in claim 3, wherein the facing surfaces of the first and second elements are concave.

5. A transmission as defined in claim 4, wherein the driven element is rotatably mounted about the transmission axis between the driver elements.

6. A transmission as defined in claim 5, further comprising driving means coupled to at least one of the driver elements for rotating the driver elements by means of a prime mover.

7. A transmission as defined in claim 4, wherein the first and second elements are toroidal discs.

8. A continuously variable transmission comprising a first element rotatable about a transmission axis, a second element spaced from the first element and rotatable about the transmission axis, wherein the first element and the second element have facing concave surfaces, a third power transmitting element fully rotatable about the transmission axis, and at least one roller rotatably mounted on a portion of the third element located between the first element and the second element for peripheral surface contact with each of the facing concave surfaces of the first and second elements, said roller interacting with said first and second elements and thereby rotating said third element about the transmission axis, shifting means for shifting points of contact between the roller and the first element and the roller and the second element so as to change the radii extending from the transmission axis to the points of contact, and means for counter-rotating the first element relative to the second element.

9. A transmission as defined in claim 8, wherein the means for counter-rotating the first and second elements drives the first and second elements at equal speeds.

10. A transmission as defined in claim 8, wherein angular momenta resulting from moments of inertia associated with rotation of the driver elements cancel during operation.

11. A transmission as defined in claim 10, wherein the first driver element has a mass and moment of inertia which is substantially the same as that of the second driver element.

12. A continuously variable transmission, comprising a first driver disc rotatable about a pre-determined transmission axis; a second driver disc spaced from the first disc and counter-rotatable about the transmission axis relative to the first driver disc; wherein the first driver disc and second driver disc have facing concave surfaces; driven roller carrier means rotatable about the transmission axis; at least one roller rotatably mounted on an interdisc portion of the roller carrier means for peripheral surface contact with the facing concave surfaces of the driver discs, the roller interacting with the driver discs to drive the roller carrier means so that power can be taken from the roller carrier means; and roller tilting means for tilting the axis of rotation of the roller so as to produce a continuous range of roller carrier means speeds including forward, reverse and neutral for a given speed of counterrotation of the first and second driver discs.

13. A transmission as defined in claim 12, wherein the roller carrier means is rotatably mounted about the transmission axis between the first and second disc.

14. A transmission as defined in claim 12, comprising at least two circular rollers mounted in the roller carrier means in a circularly symmetric fashion.

15. A transmission as defined in claim 14, wherein the roller carrier means comprises a central hub rotatable about the transmission axis, and a roller support arm for supporting each of the at least two rollers, wherein the roller support arms are affixed to and extend radially outwardly from the hub, and wherein each roller arm carries at its free end a yoke lying generally in a plane parallel to the planes of the discs, within which is mounted one of the rollers.

16. A transmission as defined in claim 15, wherein each of the rollers is mounted in a roller cage which is rotatably mounted in one of the yokes.

17. A transmission as defined in claim 12, wherein the roller tilting means comprises a slider assembly rotatably mounted about the transmission axis and coupled to the roller carrier means for translating axial movement along the transmission axis into rotational movement of the roller cages.

18. A transmission as defined in claim 17, wherein the slider assembly comprises a slider hub rotatably and axially slidably mounted about the transmission axis and enclosing the central hub of the roller carrier means, and slider arms extending radially from the slider hub and terminating in actuation means coupled to the roller cages.

19. A transmission as defined in claim 18, wherein the roller cages each include a cage drive end flange lying outside of the yoke in a plane normal to the plane of the disc and coupled to one end of the roller cage by means of a cylindrical extension member rotatably mounted in the yoke, such that rotation of the flange results in rotation of the roller axis.

20. A transmission as defined in claim 19, wherein the cage drive end flange is provided with a cage flange pin extending from the surface thereof remote from the yoke and lying in a plane normal to the plane of the cage drive end flange, and wherein the actuation means comprises actuator blocks each lying adjacent one of the cage drive end flanges and in a plane parallel thereto and each having slots for receiving the cage flange pin of the adjacent cage drive end flange.

21. A transmission as defined in claim 12, comprising three circular rollers mounted in a roller carrier assembly in a circularly symmetric fashion.

22. A transmission as defined in claim 12, further comprising bias means for producing bias forces between the first disc and the second disc and the at least one roller.

23. A transmission as defined in claim 12, further comprising reversal drive means for counter-rotating the discs.

24. A transmission as defined in claim 12, further comprising a shaft rotatably mounted along the predetermined transmission axis, for fixedly mounting thereon the roller carrier means, and for rotatably mounting thereon the first disc and the second disc.

25. A transmission as defined in claim 12, wherein the discs are each of substantially the same mass and moment of inertia, and one of the discs is capable of counter-rotating relative to the other of the discs.

26. A continuously variable transmission, comprising:
 (a) a fully rotatable shaft defining a transmission axis;
 (b) a first driver disc concentric with the shaft and rotatably mounted thereon;
 (c) a second driver disc concentric with the shaft and rotatably mounted thereon, spaced from the first driver disc, and being a mirror mate of the first driver disc;
 (d) wherein the first driver disc and the second driver disc each have facing surfaces of circular symmetry between its hub and its periphery formed as a concave surface of arcuate radial section;
 (e) a driven roller carrier concentric with and rigidly mounted on the shaft between the first disc and the second disc;
 (f) at least two circular rollers of radius equal to the radius of the arcuate radial sections symmetrically mounted on the roller carrier for peripheral surface engagement with the facing concave surfaces of the driver discs;
 (g) wherein the rollers are capable of interacting with the driver discs to drive the roller carrier so that power can be taken therefrom;
 (h) roller tilting means for tilting the axis of rotation of the at least two rollers in the same sense in response to a force directed along the axis of the shaft so as to produce a continuous range of roller carrier speeds including forward, reverse and neutral; and
 (i) means for counter-rotating one of the driver discs relative to the other driver disc.

27. A transmission as defined in claim 26, wherein the roller axis tilting means comprises a rod slidably mounted within the transmission shaft, and a lever coupled to each roller and to the rod for tilting the axes of rotation of the rollers in the same sense when the rod is moved along the axis of the transmission shaft.

* * * * *